Figure 1:
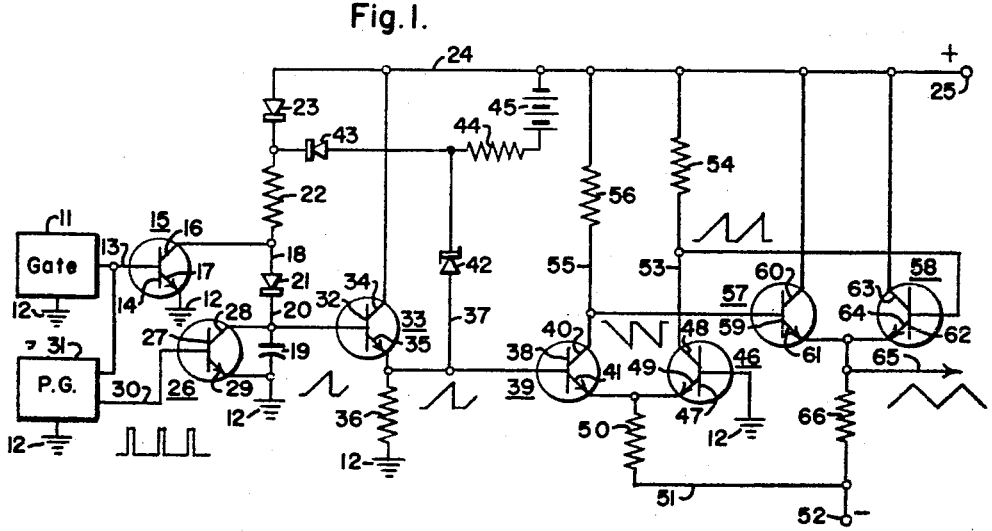

United States Patent Office 2,933,623
Patented Apr. 19, 1960

2,933,623

APPARATUS FOR GENERATING AN ELECTRICAL SIGNAL HAVING A TRIANGULAR WAVEFORM

Wesley N. Jones, Severna Park, and Walter Ewanus, Glen Burnie, Md., assignors to Westinghouse Electric Corporation, East Pittsburgh, Pa., a corporation of Pennsylvania Application August 13, 1957, Serial No. 677,944

5 Claims. (Cl. 307—88.5)

This invention relates to electrical signal generators, and more particularly to generators for producing signals or voltages having triangular waveforms.

The use of a sweep voltage having a triangular waveform with symmetrical slopes as the voltage increases and decreases in amplitude in several types of display tubes and other devices has an advantage over the use of a sawtooth sweep voltage because the triangular sweep voltage eliminates the need for a flyback.

In the apparatus of the instant invention, a voltage of sawtooth waveform is first obtained by means including a pulse operated transistor switch for controlling the charging and discharging of a capacitor. The voltage of sawtooth waveform is applied to a balanced amplifier to reproduce in a pair of voltages of similar amplitudes the sawtooth waveform and a waveform of opposite slope. This pair of sawtooth voltages of opposite slopes are compared in an amplitude comparator which provides an output voltage having a triangular waveform composed of symmetrical portions of the positive-going sawtooth and the negative-going sawtooth voltages.

The apparatus includes circuit means for utilizing a gate, such, for example, as a gate voltage initiated by some sequence of radar target acquisition to cause the sawtooth voltage to stop its linear rise and thereby stop the rise or fall of the triangular output voltage and provide a direct-current output voltage having an amplitude corresponding to the amplitude of the sawtooth voltage at the time its rise was stopped by the gate voltage, thereby providing a memory device capable of storing information regarding the time of initiation of the gate.

Accordingly, a primary object of the instant invention is to provide a new and improved generator for producing a signal or voltage having a triangular waveform.

Another object is to provide a new and improved generator for producing a voltage having a triangular waveform with symmetrical slopes as the voltage increases and decreases in amplitude.

Another object is to provide a new and improved generator for a sweep voltage of triangular waveform and including a memory circuit, whereby the sweep voltage is converted to a direct-current voltage having an amplitude variable in accordance with variations in the time of occurrence of a gating voltage.

Still another object is to provide a new and improved generator employing transistors for producing a sweep voltage of triangular waveform.

A further object is to provide a new and improved generator for producing a voltage of triangular waveform in which a voltage having a sawtooth waveform is inverted to provide an additional voltage having a sawtooth waveform of opposite slope, the two voltages being compared in an amplitude comparator providing an output voltage having a triangular waveform with symmetrical slopes as the output voltage increases and decreases in amplitude.

Figure 2:
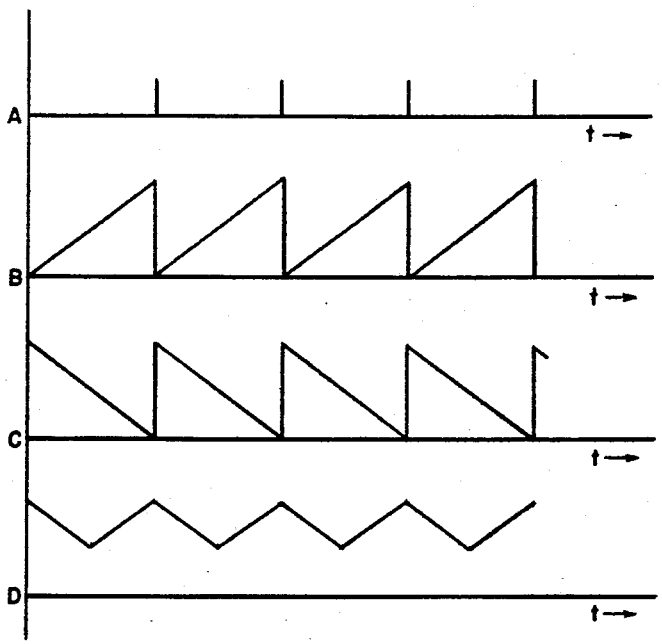
Figure 3:
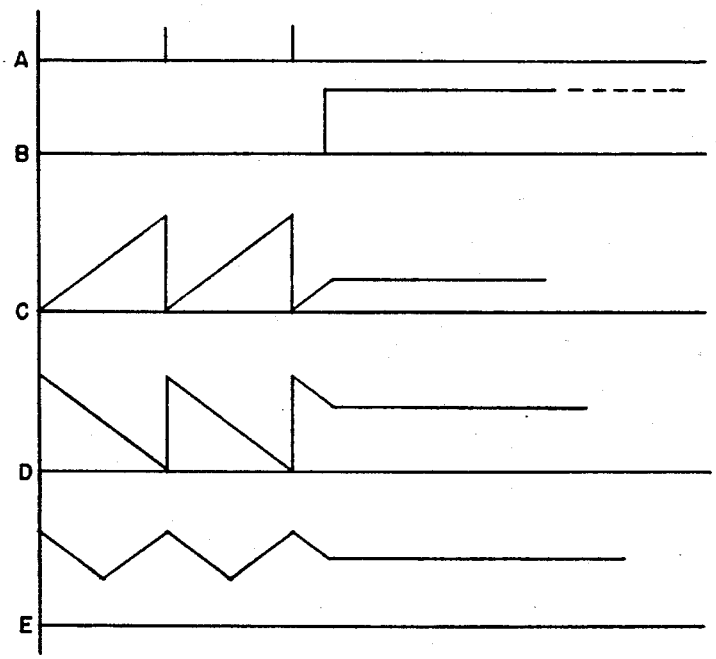
Figure 4:
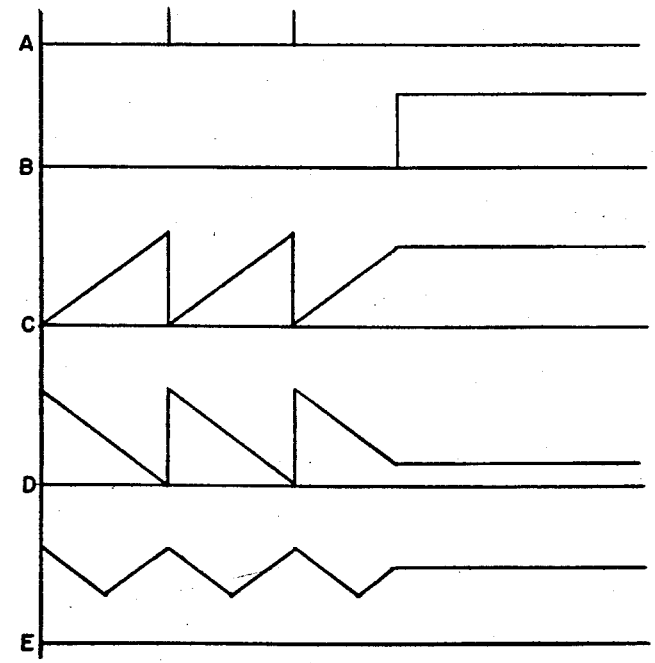

Other objects and advantages will become apparent after a perusal of the following specification when read in connection with the accompanying drawings, in which:

Figure 1 is a schematic electrical circuit diagram of the generator apparatus according to the preferred embodiment thereof; and Figs. 2, 3 and 4 are graphs illustrating the operation of the apparatus of Fig. 1.

Particular reference should be made now to Fig. 1 for a more complete understanding of the invention. The reference numeral 11 indicates means for obtaining a gating voltage such, for example, as the voltage representing an acquisition gate in radar apparatus and having a waveform illustrated by curve B of Fig. 3, to which further reference will be made hereinafter. The output of the gate producing means 11, Fig. 1, is applied between the ground 12 and lead 13 which is connected to the base 14 of a transistor-triode generally designated 15, the triode also having a collector 16 and emitter 17 connected to ground 12. Collector 16 is connected to lead 18 for purposes to be made hereinafter more clearly apparent.

The initial voltage of sawtooth waveform is provided by the charging and rapid discharging of a capacitor 19 having one terminal thereof connected to ground 12 and the other terminal thereof connected by way of lead 20 to one terminal of a rectifier 21, the other terminal of rectifier 21 being connected by way of the aforementioned lead 18 to one terminal of a resistor 22, the other terminal of resistor 22 being connected by way of a rectifier 23, to a lead 24 which is connected to the positive terminal 25 of a suitable source of direct current potential, not shown, the other terminal of the source of direct current potential being connected to ground 12.

An additional triode-transistor, generally designated 26, is provided as shown, having a base 27, collector 28 and emitter 29. The collector 28 is connected to the aforementioned lead 20, while the emitter 29 is connected to ground 12. The aforementioned base 27 is connected by way of lead 30 to a pulse generator 31. The pulse generator 31 may be of any convenient design such, for example, as a free-running device of the relaxation oscillator type or other convenient type, providing a pulse output comprising a series of equally spaced pulses of very short duration, such as those illustrated by curves A of Figs. 2, 3 and 4.

Lead 20 and the aforementioned collector 28 of transistor 26 are connected to the base 32 of another triode-transistor, generally designated 33, and having a collector 34 and emitter 35. The collector 34 is connected to the aforementioned lead 24, while the emitter 35 is connected by way of resistor 36 to ground 12. The junction between emitter 35 and resistor 36 is connected by way of lead 37 to the base 38 of an additional transistor generally designated 39, and having a collector 40 and emitter 41.

The aforementioned lead 37 is connected by way of a diode rectifier 42 to the junction between an additional rectifier 43 and a resistor 44, the other terminal of rectifier 43 being connected to the junction between the aforementioned resistor 22 and rectifier 23, the other terminal of resistor 44 being connected by way of a suitable source of direct-current potential 45 to the aforementioned lead 24.

The operation of the aforementioned portions of the circuit will be readily understood by those skilled in the art. Assume, by way of description, that there is no gate output from gate generator 11. In the absence of a gate voltage on lead 13, the aforementioned transistor-triode 15 presents a substantial open-circuit between collector 16 and emitter 17 thereof. Assume also, by way of description, that a pulse output from pulse generator 31 applied to transistor 26 has just ended, for the reason that a pulse on lead 30 renders the triode-transistor 26 conductive and places a substantial short-circuit across capacitor 19 by way of collector 28 and emitter 29 discharging the capacitor 19 and reducing the voltage there across to substantially zero.

When the pulse on lead 30 and base 27 ends, the capacitor 19 begins to charge from the aforementioned source having positive terminal 25 by way of lead 24, rectifier 23, resistor 22, and rectifier 21. The aforementioned transistor 33 together with the aforementioned diodes 23, 43 and 42 provide a bootstrap circuit to assist in the creation of a substantially linear sawtooth waveform, as will be readily understood by those skilled in the art. Preferably, the diode 42 is a type known in the art as a Zener diode, the use of which speeds up the flyback time by eliminating the time required to charge a capacitor which might be used in a conventional bootstrap circuit.

Still another triode-transistor, generally designated 46, is provided as shown, having a base 47, collector 48 and emitter 49, base 47 being connected to ground 12, emitter 49 being connected to the aforementioned emitter 41, emitters 41 and 49 being connected by way of resistor 50 and lead 51 to the negative terminal 52 of an additional suitable source of direct-current potential, not shown, the positive terminal of the additional source of direct-current potential being connected to ground 12. Collector 48 is connected by way of lead 53 and resistor 54 to the aforementioned lead 24, and the waveform on lead 53, as illustrated by the adjacent pulses in Fig. 1, is similar to the waveform on lead 37, having a positive-going slope of the same polarity. The aforementioned collector 40 of transistor 39 is connected by way of lead 55 and resistor 56 to the aforementioned lead 24, and the waveform of the pulses on lead 55, as shown by the adjacent pulse, has a negative-going slope and is inverted from that of the voltage on the aforementioned lead 53.

An amplitude comparison circuit is provided as aforementioned, including a pair of additional triode-transistors 57 and 58, transistor 57 having a base 59, collector 60 and emitter 61, transistor 58 having a base 62, collector 63 and emitter 64. The aforementioned lead 53 is connected to the aforementioned base 62 of transistor 58, whereas the aforementioned lead 55 is connected to base 59 of transistor 57. Collectors 60 and 63 are connected to the aforementioned lead 24, whereas emitters 61 and 64 are connected together and by way of lead 65 and resistor 66 to the aforementioned lead 51 The usable output voltage of the triangular sweep generator is delivered to lead 65 and has the waveform shown adjacent to lead 65, the waveform being triangular with symmetrical slopes as the voltage increases and decreases in amplitude, the output voltage being composed of alternate portions of the positive-going and negative-going slopes depending upon which sawtooth voltage applied to the voltage comparator has the greater instant amplitude.

For reasons which will become hereinafter more clearly apparent, the output of the gate obtaining means 11 as delivered to lead 13 is also delivered to the aforemented pulse generator 13. The presence of a gate on lead 13 stops the generation of pulses in the pulse generator 31.

The apparatus hereinbefore described has two distinct modes of operation depending upon whether or not the gate generator 11 provides a gate output. Assume, by way of description, a first mode of operation in which the gate generator 11 does not provide any output on lead 13. In the absence of a gate, pulses of brief duration, of substantially similar amplitude, and spaced from each other by substantially identical time intervals are provided on lead 30 and applied between the base 27 and emitter 29 of triode-transistor 26. The pulses while applied between the base 27 and emitter 29 provide for a highly conductive path of very low resistance between the collector 28 and emitter 29. Accordingly, while a pulse on lead 30 is present, a substantial short-circuit is placed across the capacitor 19 rapidly discharging the capacitor. When the pulse ends, the capacitor 19 begins to charge, current flowing into the capacitor 19 from terminal 25 by way of lead 24, rectifier 23, resistor 22, lead 18, rectifier 21 and lead 20. An aforementioned bootstrap circuit including transistor 33, diode 42 and rectifiers 43 and 23 provides for charging the capacitor 19 at a substantially linear rate so that the voltage thereacross builds up at a substantially linear rate instead of an exponential rate, in a manner which will be readily understood by those skilled in the art. The voltage developed between the emitter 35 of triode-transistor 33 and ground 12 and developed across resistor 36 has the same positive-going direction of slope as the voltage on lead 20 and is applied to the base 38 of the aforementioned triode-transistor 40. The polarity or slope of the voltage of sawtooth waveform is inverted in the triode-transistor 40, with the result that the voltage on lead 55 has a negative-going slope opposite to the slope of the applied voltage on lead 37, whereas the voltage on lead 53 connected to the collector 48 of transistor 46 has a positive-going slope similar to the positive-going slope of the voltage on lead 37. The voltages on leads 55 and 53 are applied to the bases 59 and 62, respectively, of the aforementioned transistor-triodes 57 and 58, respectively. These last-named two transistor-triodes comprise a voltage comparison circuit and portions of the applied voltages of sawtooth waveforms are passed to the output lead 65 in accordance with which of the sawtooth voltages has the greater instantaneous amplitude.

The relative wave shapes of the respective voltages will be more readily understood by reference to Fig. 2, in which the curve A illustrates the pulses on the aforementioned lead 30, curve B illustrates the voltage of sawtooth waveform on leads 20, 37 and 53, curve C illustrates the voltage of sawtooth waveform having the opposite slope on lead 55, and curve D illustrates the triangular output voltage on lead 65. Curves A, B, C and D have substantially the same time base. It will be noted that the voltage of curve D slopes downward for a period corresponding to the period during which voltage C is of greater instantaneous amplitude than voltage B, and that voltage D reverses its direction of slope and begins to increase in amplitude following the instant that voltages B and C are of the same amplitude, voltage D thereafter increasing in amplitude until the moment that voltage B reaches its maximum amplitude, which corresponds to the moment that voltage C is substantially zero. Thereafter, the cycle of voltage D is repeated.

Assume now a second mode of operation in which a positive gate voltage is generated by gate generator 11 and has a form illustrated by curve B of Fig. 3 to which particular reference is now made. As aforementioned, the gate appearing on lead 13 is appiled to the pulse generator 31 stopping the production of any further pulses with the result that there are no further pulses in curve A of Fig. 3 after the occurrence of the gate voltage of curve B. The positive gate voltage on lead 13 is applied between the base 14 and emitter 17 of triode-transistor 15, producing a high conductivity path of very small resistance between collector 16 and emitter 17 and effectively grounding lead 18. At the instant that this occurs, the charging of the aforementioned capacitor 19 is stopped because lead 18 is at substantially ground potential; the rectifier 21 because of its polarity, as shown, prevents any substantial discharge of capacitor 19 so that the voltage across capacitor 19 remains substantially at the value it had when the gate from gate generator 11 occurred, as illustrated by curve C of Fig. 3. The voltages on the aforementioned leads 53 and 55 also become direct-current voltages having amplitudes corresponding to the instant of the occurrence of the gate on lead 13 with respect to the time of occurrence of the last preceding pulse on lead 30, as illustrated by the graphs C and D, respectively, of Fig. 3. Accordingly, the output of the amplitude comparison circuit of transistors 57 and 58 becomes a direct-current potential as illustrated by curve E of Fig. 3, having an amplitude corresponding to the aforementioned time interval between the occurrence of the gate on lead 13 and the last preceding pulse on lead 30.

Particular reference should be made now to Fig. 4, which is similar to Fig. 3, but which illustrates the occurrence of the gate voltage illustrated by graph B at a later time interval with respect to the last preceding pulse A than the gate of Fig. 3. Curves C and D of Fig. 4 correspond to the voltages on leads 53 and 55, respectively, as before. It will be noted that the output voltage as illustrated by curve E of Fig. 4 becomes a direct-current voltage on lead 65 having an amplitude corresponding to the time of occurrence of the gate on lead 13 with respect to the occurrence of the last preceding pulse on lead 30, as more fully explained hereinbefore.

It will be seen then, that the apparatus in its second mode of operation provides a memory feature which is especially suitable for use in radar apparatus where the gate on lead 13 is an acquisition gate, the gate varying in time and being controlled by a search phase of the radar apparatus. Upon detection, the gate appears at the time indicated, for example by Fig. 3, causing the sawtooth to stop its linear rise or fall and to hold the direct-current output on lead 65 at a level corresponding to the time. As the time of occurrence of the gate varies, so will the amplitude of the direct-current voltage. There is provided then, by this action, a memory circuit or memory device capable of storing information regarding the time of initiation of the gate on lead 13.

Whereas for convenience of illustration, a circuit arrangement has been shown in which the gate on lead 13 is applied to pulse generator 31 and pulse generator 31 is constructed and arranged to stop the production of further pulses upon the application of the gate voltage, it will be readily understood that other circuit means might be provided whereby the gate on lead 13 would be utilized in other manners to prevent the discharge and further charging of capacitor 19.

Transistors of either the n-p-n or p-n-p types may be employed, suitable circuit provisions being made.

Where the word "voltage" is employed herein and in the claims appended hereto, it should be understood that "or signal" is implied.

If desired, an electron discharge tube may be substituted for transistor 33 to increase the time required for the charge to leak off capacitor 19.

Whereas the invention has been shown and described with respect to an embodiment thereof which gives satisfactory results, it should be understood that changes may be made and equivalents substituted without departing from the spirit and scope of the invention.

We claim as our invention:

1. A signal generator comprising, in combination, means for obtaining a pair of signals having sawtooth waveforms, the slopes of the signal waveforms being in opposite directions with respect to each other, and signal amplitude comparison means operatively connected to said first-named means and responsive to said pair of signals for producing an output signal varying as a linear function of one of said pair of signals depending upon which signal has the greater instantaneous amplitude to thereby provide an output signal in the output circuit means having a triangular waveform with symmetrical slopes as the output signal increases and decreases in amplitude.

2. A voltage generator comprising, in combination, means for obtaining a voltage of sawtooth waveform having a predetermined direction of slope, other means operatively connected to said first-named means and having said voltage applied thereto for obtaining an additional voltage of sawtooth waveform, said additional voltage having a slope opposite to the slope of said first-named voltage, and amplitude comparison means operatively connected to said other means and the first-named means and responsive to said sawtooth voltages to alternately utilize said sawtooth voltages in accordance with which of said voltages has the greater instant amplitude to provide an output voltage having a triangular waveform with symmetrical slopes as the output voltage increases and decreases in amplitude.

3. Voltage generator apparatus comprising, in combination, means for obtaining a voltage having a sawtooth waveform with a predetermined direction of slope, other means operatively connected to said first-named means for utilizing said voltage of sawtooth waveform to obtain an output voltage having a triangular waveform with symmetrical slopes as the output voltage increases and decreases in amplitude, and means operatively connected to said first-named means for changing the form of the voltage from a sawtooth waveform to a direct-current at a preselected instant, said other means at said instant also changing its output voltage from a triangular waveform to a direct-current voltage having an amplitude corresponding to the time of said change.

4. Voltage generator apparatus comprising, in combination, a capacitor, means operatively connected to said capacitor for charging the same, means operatively connected to said capacitor for periodically discharging the same at a rapid rate, the voltage developed across said capacitor as it charges and discharges normally having a substantially sawtooth waveform, means operatively connected to said capacitor for utilizing said voltage of sawtooth waveform to provide an output voltage normally having a triangular waveform with symmetrical slopes as the output voltage increases and decreases in amplitude, and means operatively connected to said capacitor and adapted to have a gate voltage applied thereto for stopping the charging of said capacitor at an instant corresponding to the beginning of the gate voltage and preventing the further discharging of said capacitor, said output voltage becoming a direct-current voltage at the time the gate voltage begins and having an amplitude corresponding to the time of occurrence of the gate voltage.

5. A voltage generator comprising, in combination, a capacitor, means operatively connected to said capacitor for charging the capacitor at a substantially linear rate, means operatively connected to said capacitor for periodically discharging said capacitor at a rapid rate, the voltage developed across said capacitor during the charging and discharging thereof having a substantially sawtooth waveform, voltage obtaining means operatively connected to said capacitor for utilizing said voltage of sawtooth waveform to obtain a pair of additional voltages, one voltage of said pair having a slope similar to the slope of said first-named voltage and the other voltage of said pair having a slope opposite to the direction of the slope of said first-named voltage, amplitude comparison means operatively connected to said voltage obtaining means, said amplitude comparison means including an output circuit, said amplitude comparison means being constructed and arranged to alternately pass to said output circuit portions of said pair of sawtooth voltages in accordance with which voltage of the pair has the greater instant amplitude to thereby provide an output voltage of triangular waveform with symmetrical slopes as the output voltage increases and decreases in amplitude, and means adapted to have a gate voltage applied thereto and operatively connected to said capacitor, said last-named means being constructed and arranged to prevent the further charging and discharging of said capacitor upon the appearance of said gate voltage, said amplitude comparison means upon the occurrence of said gate voltage changing its output voltage from a triangular waveform to a direct-current voltage having an amplitude corresponding to the time of occurrence of said gate voltage.

References Cited in the file of this patent

UNITED STATES PATENTS

| | | |
|---|---|---|
| 2,240,420 | Schnitzer | Apr. 29, 1941 |
| 2,405,238 | Seeley | Aug. 6, 1946 |
| 2,552,588 | Reeves | May 15, 1951 |
| 2,692,333 | Holmes | Oct. 19, 1954 |
| 2,768,294 | Overbeek | Oct. 23, 1956 |
| 2,797,327 | Kidd | June 25, 1957 |
| 2,871,378 | Lohman | Jan. 27, 1959 |